United States Patent
Copeland

Patent Number: 5,978,019
Date of Patent: Nov. 2, 1999

[54] CABLE FRAUD DETECTION SYSTEM AND METHOD

[75] Inventor: David C. Copeland, Lighthouse Pt., Fla.

[73] Assignees: MediaOne Group, Inc., Englewood; US West, Inc., Denver, both of Colo.

[21] Appl. No.: 08/999,279

[22] Filed: Dec. 29, 1997

[51] Int. Cl.[6] .................................................. H04N 5/225
[52] U.S. Cl. ........................... 348/180; 348/192; 348/12; 348/17; 455/3.1; 455/5.1; 340/825.31
[58] Field of Search ..................................... 348/1, 2, 4, 6, 348/10, 12, 13, 5.5, 180, 192; 455/2, 3.1, 5.1, 6.1, 6.2; 340/825.31

[56] References Cited

U.S. PATENT DOCUMENTS

| | | |
|---|---|---|
| 4,550,341 | 10/1985 | Naito . |
| 4,736,421 | 4/1988 | Morita et al. .............................. 380/20 |
| 5,883,664 | 3/1999 | So ........................................... 348/192 |

OTHER PUBLICATIONS

"Squeezing the cable thieves: Law's on Cox's side", San Diego Tribute, date prior to May, 1983.

*Primary Examiner*—Andrew I. Faile
*Assistant Examiner*—Sam Huang
*Attorney, Agent, or Firm*—Brooks & Kushman, P.C.

[57] ABSTRACT

A system and method for detecting unauthorized access to a CATV system at a site, including inserting a cable fraud detection unit into the site drop, periodically obtaining a first sample of a content signal from the site with the detection unit so as to determine if the site is accessing the content signal, storing the first sample in the detection unit, periodically obtaining a second sample of the content signal from the CATV system with the detection unit to serve as a reference for the first sample, and storing the second sample in the detection unit. The stored samples may be transmitted to the CATV system in response to a control signal or may be transmitted to a portable unit.

8 Claims, 2 Drawing Sheets

CABLE FRAUD DETECTION SYSTEM AND METHOD

TECHNICAL FIELD

The present invention relates in general to monitoring cable television reception and more specifically to determining to which channel a cable television receiver is tuned for the purpose of detecting fraudulent access.

BACKGROUND ART

A cable system (community access television or CATV system) consists of a head end which transmits a plurality of signals with entertainment and informational content simultaneously to customer sites through a tree-like cable plant. Some content signals may be available to all cable customers. Other content signals, such as pay-per-view and premium programs, should only be accessed by sites which have authorized equipment, such as a cable box, and for which appropriate remuneration has been arranged.

Sites exist which posses equipment, often called a "black box", for accessing unauthorized signals. The use of such equipment for accessing unauthorized content signals constitutes fraud, and results in loss of income for CATV system operators.

Traditionally, detecting sites fraudulently accessing CATV content signals has required an eye witness account of the activity. This is usually difficult since someone must be inside the site to view the unauthorized programming.

Current technological solutions to detecting cable access fraud require interrupting the cable system drop before it enters the site, inserting equipment capable of determining to which signal receivers in the site are tuned, recording the information, and interrupting service again to remove the equipment. Several problems arise from this process. First, the cable service must be disconnected just prior to measurement, alerting anyone viewing the unauthorized signal. Second, the manual nature of the process makes it difficult to establish a pattern of fraud at the site.

What is needed is an automated approach to detecting cable fraud. The approach should minimize the number of service interruptions as well as record data over an extended period of time.

SUMMARY OF THE INVENTION

It is a primary object of the present invention to determine fraudulent access of cable signals at a site in an automated fashion.

Another object of the present invention is to determine fraudulent access of cable signals at a site over an extended period of time.

Still another object of the present invention is to determine fraudulent access of cable signals at a site with a minimum number of service interruptions.

In carrying out the above objects and other objects and features of the present invention, a system is described for detecting unauthorized access to a CATV system at a site. The system includes a two-way splitter inserted backwards into the drop between the CATV system and the site; a controllable switch with one throw connected to an output of the splitter, another throw connected to the CATV system, and a pole connected to a signal analyzer; a memory; and a control logic in communication with the signal analyzer, the switch, and the memory, the control logic operative to (a) periodically determine a monitored signal from the plurality of content signals available from the CATV system, (b) set the switch so as to connect the signal analyzer to the splitter, (c) obtain a first sample of the monitored signal from the site using the signal analyzer, the first sample indicative of site access of the monitored signal, (d) store the first sample, (e) set the switch so as to connect the signal analyzer to the CATV system, (f) obtain a second sample of the monitored signal from the CATV system using the signal analyzer, the second sample indicative of the level of the monitored signal in the CATV system, and (g) store the second sample.

In one embodiment, an amplifier is inserted in the path from the CATV system through the splitter and into the site so as to compensate for losses due to insertion of the fraud detection system.

In another embodiment, the control logic is further in communication with the CATV system and further operates to transmit stored signals to the CATV system in response to a control signal from the CATV system.

In still another embodiment, the control logic is further in communication with a portable unit and further operates to transmit stored signals to the portable unit.

A method is also provided in accordance with the present invention for a cable fraud detection system. The method includes inserting a cable fraud detection unit into the drop, periodically obtaining a first sample of a content signal from the site so as to determine if the site is accessing the content signal, storing the first sample, periodically obtaining a second sample of the content signal from the CATV system to serve as a reference for the first sample, and storing the second sample in the cable fraud detection unit.

The above objects and other objects, features, and advantages of the present invention are readily apparent from the following detailed description of the best mode for carrying out the invention when taken in connection with the accompanying drawings.

BEST MODES FOR CARRYING OUT THE INVENTION

Figure 1:
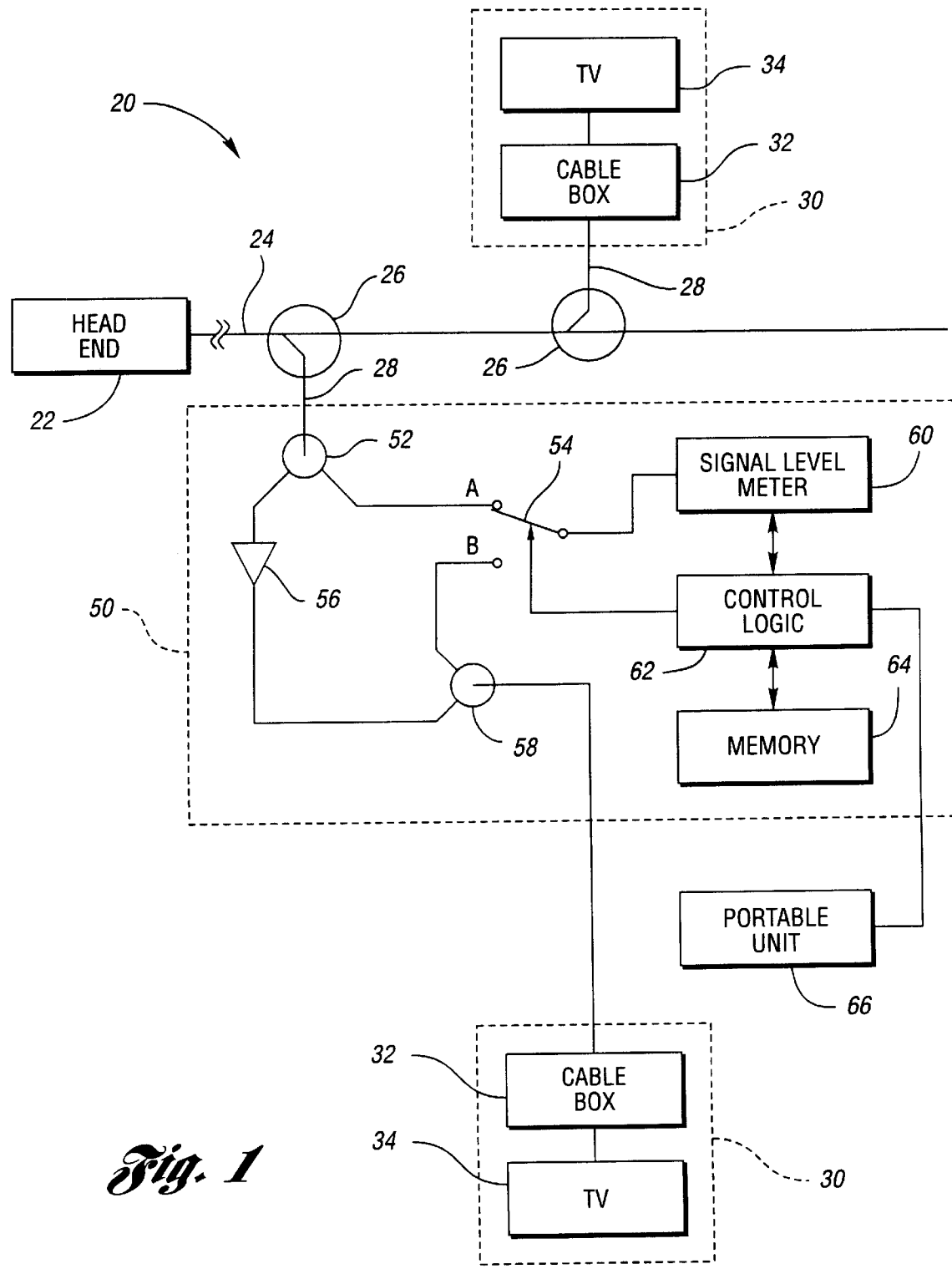
FIG. 1 is a schematic diagram of an embodiment of the present invention connected in a cable system.

Referring now to FIG. 1, a schematic diagram of an embodiment of the present invention connected in a cable system is shown. A cable system, shown generally as 20, consists of head end 22 and a cable plant, one branch of which is shown as 24. A tap 26 connects a drop 28 to the remainder of the cable plant. Drop 28 terminates at a customer site 30. Within site 30, customer equipment such as cable box 32 and television set 34 are operative to view content signals delivered by cable system 20.

An embodiment of the present invention is shown. A cable fraud detection system, shown as 50, is inserted into drop 28. A two-way branching means 52 connects at the cable plant side. In one embodiment, branching means 52 is implemented using a two-way splitter with the input connected to the cable plant side. A first output of branching means 52 connects to a first throw of controllable switch 54, labeled "A" in FIG. 1. In a preferred embodiment, a second output of branching means 52 connects to the input of amplifier 56 and the output of amplifier 56 connects to a first output of splitter 58. In another embodiment, amplifier 56 is not used, and the second output of branching means 52 connects directly to first output of splitter 58. The input of splitter 58 connects to the site side of drop 28. Note that splitter 58 is connected backwards from conventional usage and, hence, content signal flow is into the first output and out of the input.

A second output of splitter 58 is connected to a second throw of switch 54, labeled "B" in FIG. 1. A pole of switch 54 is connected to a sampling input of signal level meter 60. Signal level meter 60 is operative to read the level of a signal appearing on the pole of switch 54 within a setable frequency range. The signal level may be voltage, power, or other measure of signal magnitude.

Control logic 62 is in communication with switch 54, signal level meter 60 and a memory 64. Control logic 62 is operative to set switch 54 to connect either input "A" or input "B" to signal level meter 60, to set the frequency range for signal level meter 60, to read the value obtained by signal level meter 60, and to read and write signal level values into and out of memory 64.

In an embodiment of the present invention, switch 54, signal level meter 60, control logic 62, and memory 64 are implemented with a programmable signal control meter. Such a programmable signal control meter is currently available as is commonly known in the art.

The basic operation of cable fraud detection system 50 will now be explained. Two-way splitter 58, connected backwards into the cable plant, acts as a bridge. If a device connected to the input appears as 75 ohms impedance, the isolation between the two outputs is about 20 decibels. If the input is not terminated, the isolation is about 3.5 decibels.

Figure 2:
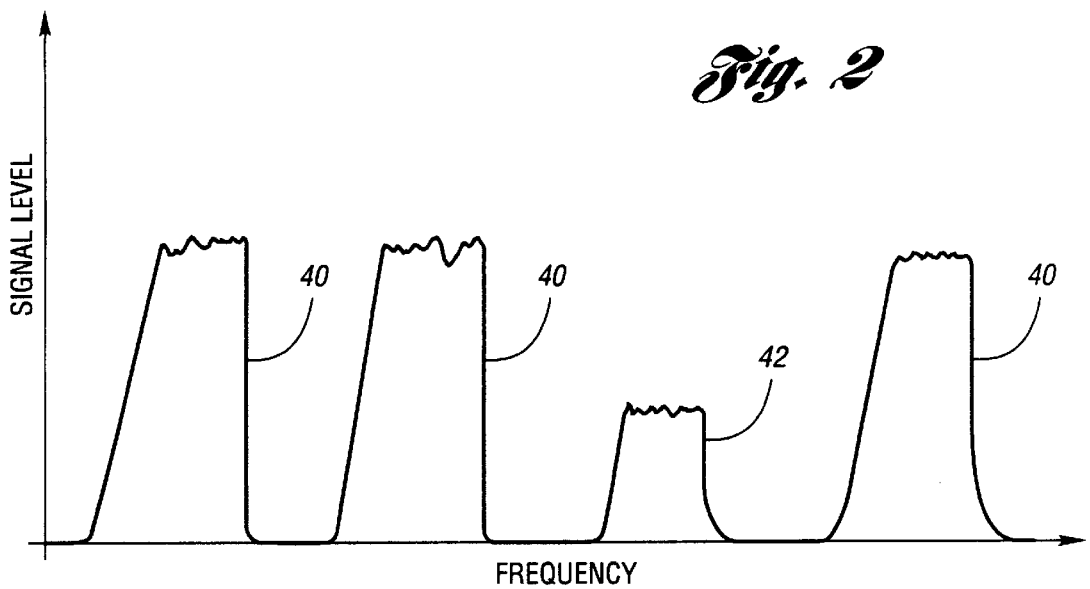
FIG. 2 is a conceptualized plot of signal strength as a function of frequency for a site tuned to a content signal on the cable system.

Referring now to FIG. 2, a conceptualized plot of signal strength versus frequency is shown. The plot includes the spectra of several content signals as they may appear looking on throw "B" of switch 54. Spectra for signals not being accessed by site 30 are indicated by 40. The spectrum for a signal that is being accessed by site 30 is shown as 42. When a receiver, such as cable box 32, is tuned to a particular signal, the receiver input appears as 75 ohms impedance at the frequency of the particular signal. The resulting 20 decibel isolation in splitter 58 significantly attenuates the accessed signal. Therefore, when examining the spectra looking into site 30, a content signal to which a receiver is tuned will have a signal level magnitude noticeably less than the signal level for the same signal if the signal was not being accessed.

Referring again to FIG. 1, the signal at throw "A" of switch 54 provides a reference against which the signal at throw "B" can be compared. It is possible that a particular content signal at "B" is attenuated not because equipment in site 30 is tuned to receive the signal, but because the signal is attenuated somewhere in cable plant 20. By sampling the content signal on both throw "A" and throw "B", the possibility of falsely detecting access of the content signal is greatly reduced.

In a preferred embodiment, amplifier 56 is used to compensate for losses through cable fraud detection system 50. Such losses, if not compensated, may be noticeable by viewers in site 30. Signals passing through splitter 58 from the first output to the input will be attenuated by 3.5 decibels. If a splitter is used to implement two-way branching means 52, any content signal will be attenuated an additional 3.5 decibels. In this case, amplifier 52 should multiply signals by a factor of 7 decibels.

In another embodiment, CATV system 20 supports reception of information by head end 22 from equipment connected to branch 24. Control logic 62 is in communication with CATV system 26 through drop 28. Control logic 62 is also operative to transmit stored samples of content signals from memory 64 in response to a command from head end 22.

In another embodiment, cable fraud detection system 50 is operable to connect to a portable unit, shown as 66 in FIG. 1, for receiving stored samples of content signals. When portable unit 66 is in communication with control logic 62, portable unit 66 may read stored samples. Modes of communication include but are not limited to electrical signals, electromagnetic signals, and acoustic signals. Portable unit 66 may be taken away from fraud detection system 50 so that the stored samples may be analyzed while fraud detection system 50 continues to collect data.

Figure 3:
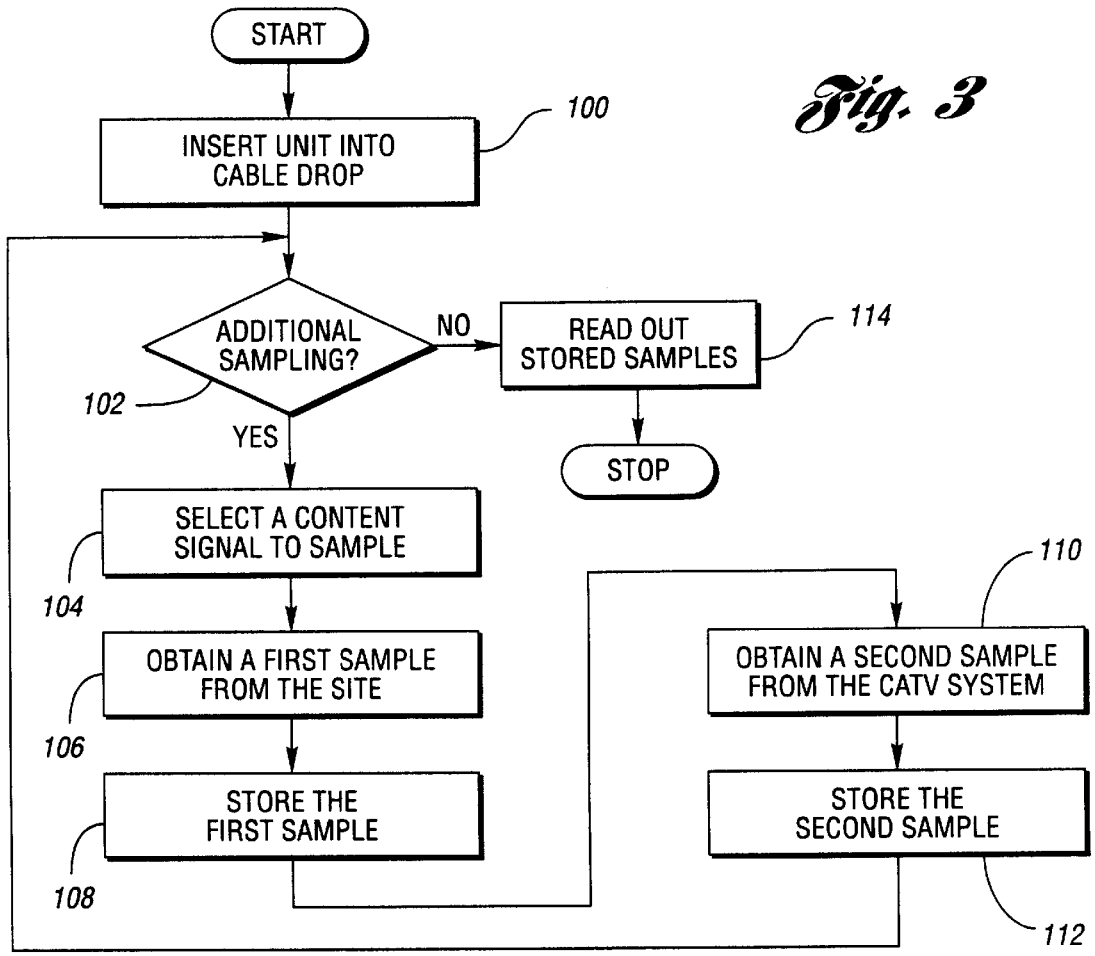
FIG. 3 is a flow diagram of a method for accomplishing the present invention.

Referring now to FIG. 3, a flow diagram of a method according to the present invention is shown. As will be appreciated by one of ordinary skill in the art, the operations illustrated in the flow diagram are not necessarily sequential operations. Similarly, operations may be controlled by software, hardware, or a combination of both. The present invention transcends any particular implementation and the embodiment is shown in a sequential flow chart form for ease of illustration.

The unit is inserted into the cable drop 100. Cable drop 28 is interrupted and cable fraud detection system 50 is inserted so as to be disposed between branch 24 and site 30. The fraud detection system 50 is designed to operate and appear as other cable system equipment. In a preferred embodiment, the unit operates with 60 volts AC, is waterproof, fits on a pedestal, and has a case with size and color similar to other pole-mounted equipment. Although customer service is interrupted once during installation, fraud detection system 50 can monitor indefinitely once in place.

For as long as required, fraud detection system 50 will continue to monitor site 30, as is indicated by block 102. If no additional sampling is required, the step indicated by 114 is performed.

A content signal to sample is selected 104. Signal level meter 60 in fraud detection unit 50 is set to examine and record a particular content signal.

A first sample from the site is obtained 106. Switch 54 in fraud detection unit 50 is set so that signal level meter 60 can sample the signal seen at site 30. Control logic 62 triggers sampling and receives the output of signal level meter 60 indicative of whether or not site 30 is currently accessing the selected content signal.

The first sample is stored 108. Control logic 62 writes the output of signal level meter 60 indicative of whether or not site 30 is currently accessing the selected content signal into memory 64. Additional information such as time of sample may also be recorded.

A second sample from the CATV system is obtained 110. Switch 54 in fraud detection unit 50 is set so that signal level meter 60 can sample the signal from CATV system 20. Control logic 62 triggers sampling and receives the output of signal level meter 60 indicative of the strength of the selected content signal delivered to site 30.

The second sample is stored 112. Control logic 62 writes the output of signal level meter 60 indicative of the strength of the selected content signal delivered to site 30 into memory 64. Additional information such as time of sample may also be recorded.

Stored samples are read out 114. In one embodiment, fraud detection system 50 is operable to transmit stored samples to head end 22 upon reception of a control signal from head end 22 as described with regards to FIG. 1 above. In another embodiment, fraud detection system 50 is operable to write stored samples into portable unit 66, which may then be taken to a different location for analysis of the samples while the remainder of fraud detection system 50 remains in the field as described with regards to FIG. 1 above. In another embodiment, fraud detection system 50 retains stored samples until it is removed from drop 28, at which time the stored samples can be read out and analyzed.

In a preferred embodiment, fraud detection system 50 can continue to sample and store content signals during and after stored samples are read out.

While the best modes for carrying out the invention has been described in detail, those familiar with the art to which this invention relates will recognize various alternative designs and embodiments for practicing the invention as defined by the following claims.

What is claimed is:

1. A cable fraud detection system for detecting unauthorized access to a CATV system at a site, wherein the site connects to the CATV system through a drop, wherein the CATV system supplies a plurality of content signals, and wherein the site is not authorized to access at least one content signal, the system comprising:

a two-way branching means inserted into the drop with input on the CATV system side;

a two-way splitter inserted into the drop between the branching means and the site, the splitter connected with input on the site side and a first splitter output connected to a first output of the branching means;

a controllable switch having a pole, a first throw and a second throw, wherein the first throw is connected to a second output of the branching means and the second throw is connected to a second output of the splitter;

a signal analyzer connected to the pole of the switch;

a memory; and a control logic in communication with the signal analyzer, the switch, and the memory, the control logic operative to (a) periodically determine a monitored signal from the plurality of content signals, (b) set the switch so as to connect the signal analyzer to the splitter, (c) obtain a first sample of the monitored signal from the site using the signal analyzer, the first sample indicative of site access of the monitored signal, (d) store the first sample, (e) set the switch so as to connect the signal analyzer to the branching means, (f) obtain a second sample of the monitored signal from the CATV system using the signal analyzer, the second sample indicative of the level of the monitored signal in the CATV system, and (g) store the second sample.

2. The cable fraud detection of claim 1 further comprising an amplifier inserted in the path from the CATV system through the branching means through the splitter and into the site, the amplifier operative to compensate for losses due to the branching means and the splitter.

3. The cable fraud detection system of claim 1, the control logic further in communication with the CATV system and further operative to transmit stored signals to the CATV system in response to a control signal from the CATV system.

4. The cable fraud detection system of claim 1, the control logic further in communication with a portable unit and further operative to transmit stored signals to the portable unit.

5. A method for detecting unauthorized access to a CATV system at a site, wherein the site connects to the CATV system through a drop, wherein the CATV system supplies a plurality of content signals, and wherein the site is not authorized to access at least one content signal, the method comprising:

inserting a cable fraud detection unit into the drop;

periodically obtaining a first sample of a content signal from the site with the cable fraud detection unit so as to determine if the site is accessing the content signal;

storing the first sample in the cable fraud detection unit;

periodically obtaining a second sample of the content signal from the CATV system with the cable fraud detection unit to serve as a reference for the first sample; and storing the second sample in the cable fraud detection unit.

6. The method for detecting unauthorized access to a CATV system as in claim 5 further comprising sending stored samples to the CATV system in response to a control signal from the CATV system received by the cable fraud detection unit.

7. The method for detecting unauthorized access to a CATV system as in claim 5 further comprising sending stored samples to a portable unit.

8. The method for detecting unauthorized access to a CATV system as in claim 5 further comprising amplifying content signals on the drop to compensate for losses introduced by the inserted cable fraud detection unit.

* * * * *